(12) United States Patent
Nagano et al.

(10) Patent No.: US 9,006,665 B2
(45) Date of Patent: Apr. 14, 2015

(54) RADIATION DETECTION APPARATUS AND RADIOGRAPHIC SYSTEM

(71) Applicant: Canon Kabushiki Kaisha, Tokyo (JP)

(72) Inventors: Kazumi Nagano, Fujisawa (JP); Satoshi Okada, Tokyo (JP); Keiichi Nomura, Honjo (JP); Yohei Ishida, Honjo (JP); Tomoaki Ichimura, Kitamoto (JP); Yoshito Sasaki, Honjo (JP); Satoru Sawada, Fujioka (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 13/658,905

(22) Filed: Oct. 24, 2012

(65) Prior Publication Data
US 2013/0134312 A1     May 30, 2013

(30) Foreign Application Priority Data
Nov. 28, 2011  (JP) ................... 2011-259510

(51) Int. Cl.
*G01T 1/10*   (2006.01)
*G01T 1/20*   (2006.01)

(52) U.S. Cl.
CPC .................. *G01T 1/2002* (2013.01)

(58) Field of Classification Search
CPC ................... G01T 1/2018; G21K 4/00
USPC ........................ 250/363.01–363.1
See application file for complete search history.

(56) References Cited

U.S. PATENT DOCUMENTS

| | | | |
|---|---|---|---|
| 4,982,136 A * | 1/1991 | Dolizy et al. | 313/527 |
| 7,141,803 B2 * | 11/2006 | Homme | 250/483.1 |
| 7,315,027 B2 | 1/2008 | Okada et al. | 250/370.11 |
| 7,538,330 B2 | 5/2009 | Nomura et al. | 250/370.1 |
| 7,714,294 B2 | 5/2010 | Sawada et al. | 250/370.11 |
| RE42,281 E * | 4/2011 | Homme | 250/483.1 |
| 8,304,735 B2 | 11/2012 | Inoue et al. | 250/361 R |
| 2011/0309258 A1 | 12/2011 | Ishida et al. | 250/369 |
| 2011/0315886 A1 | 12/2011 | Sawada et al. | 250/366 |
| 2012/0119094 A1 | 5/2012 | Inoue et al. | 250/363.01 |
| 2013/0026377 A1 | 1/2013 | Ichimura et al. | 250/367 |
| 2013/0153775 A1 | 6/2013 | Nomura et al. | 250/366 |
| 2013/0168559 A1 | 7/2013 | Saruta et al. | 250/366 |
| 2013/0187054 A1 | 7/2013 | Ishii et al. | 250/367 |

FOREIGN PATENT DOCUMENTS

| | | | | |
|---|---|---|---|---|
| GB | 2051348 A * | 1/1981 | | G01T 1/202 |
| JP | 2006-078471 | 3/2006 | | |

* cited by examiner

*Primary Examiner* — Kiho Kim
(74) *Attorney, Agent, or Firm* — Fitzpatrick, Cella, Harper & Scinto

(57) ABSTRACT

A radiation detection apparatus including a sensor unit having photoelectric conversion units two-dimensionally arranged and a scintillator layer which converts radiation into light, comprising a first member disposed on the sensor unit, and a second member disposed on the first member, wherein the scintillator layer is disposed on the second member, and letting n1 be a refractive index of the first member, n2 be a refractive index of the second member, and n3 be a refractive index of the scintillator layer, a relationship of n1<n2<n3 holds.

8 Claims, 4 Drawing Sheets

RADIATION DETECTION APPARATUS AND RADIOGRAPHIC SYSTEM

BACKGROUND OF THE INVENTION

1. Field of the Invention

The present invention relates to a radiation detection apparatus and a radiographic system.

2. Description of the Related Art

A radiation detection apparatus includes a sensor unit having a plurality of two-dimensionally arranged photoelectric conversion units and a scintillator layer which converts radiation into light. A sensor protective layer can be provided on a sensor unit, and a scintillator underlying layer for the vapor deposition of the scintillator layer can be provided under the scintillator layer. For example, Japanese Patent Laid-Open No. 2006-078471 discloses a structure including the above two members between the sensor unit and the scintillator layer.

There is a problem in that light generated in the scintillator layer in a region immediately above each photoelectric conversion unit leaks into other photoelectric conversion units (for example, adjacent photoelectric conversion units) to degrade the sharpness of the radiographed image. One conceivable cause of this problem is that some of generated light obliquely propagates instead of vertically propagating toward the sensor unit. When this apparatus includes a plurality of members, incident light leaks into other photoelectric conversion units due to the refraction and reflection of light caused by refractive index differences on the interfaces between the respective members. This is another conceivable cause of the problem. However, for example, Japanese Patent Laid-Open No. 2006-078471 has not disclosed any way of how to select refractive indices of members constituting the radiation detection apparatus from predetermined ranges of the respective members. That is, there is no consideration to the above problem.

SUMMARY OF THE INVENTION

The present invention provides a radiation detection apparatus which reduces the leakage of incident light and is advantageous to an improvement in sharpness.

One of the aspects of the present invention provides a radiation detection apparatus including a sensor unit having photoelectric conversion units two-dimensionally arranged and a scintillator layer which converts radiation into light, comprising a first member disposed on the sensor unit, and a second member disposed on the first member, wherein the scintillator layer is disposed on the second member, and letting n1 be a refractive index of the first member, n2 be a refractive index of the second member, and n3 be a refractive index of the scintillator layer, a relationship of n1<n2<n3 holds.

Further features of the present invention will become apparent from the following description of exemplary embodiments with reference to the attached drawings.

DESCRIPTION OF THE EMBODIMENTS

First Embodiment

Figure 1:
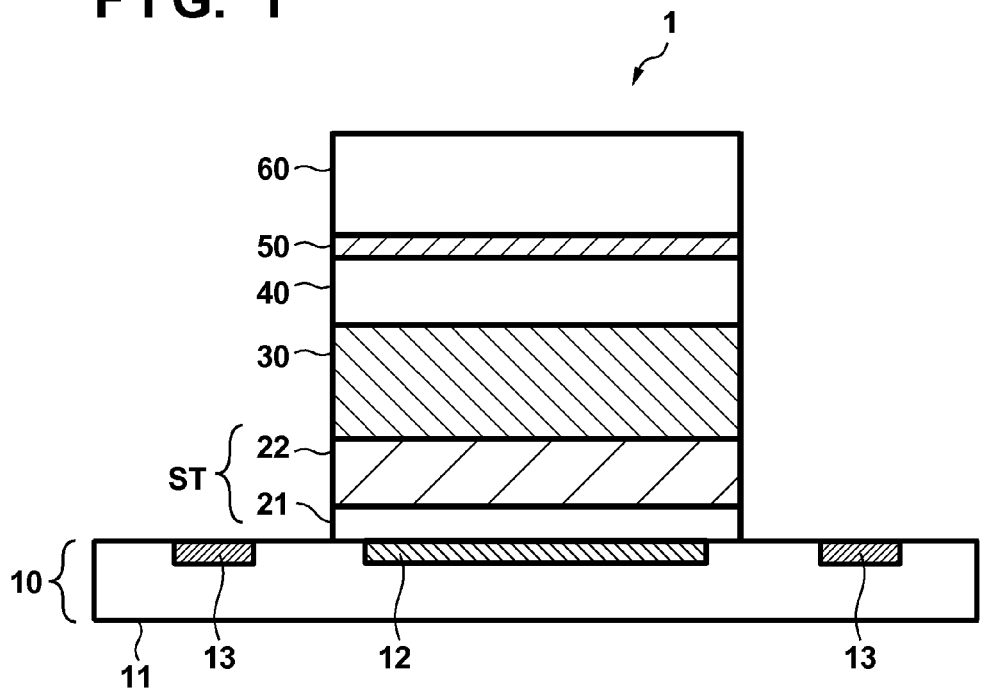
FIG. 1 is a view for explaining an example of the arrangement of a radiation detection apparatus of each embodiment.

A radiation detection apparatus 1 according to the first embodiment will be described with reference FIGS. 1 to 4. As shown in FIG. 1, the radiation detection apparatus 1 can include a sensor panel 10, a structure ST disposed on the sensor panel 10, and a scintillator layer 30 disposed on the structure ST. The sensor panel 10 can include a sensor substrate 11 and a sensor unit 12 and signal reading unit 13 disposed on the sensor substrate 11. The sensor unit 12 can include two-dimensionally arranged photoelectric conversion units (not shown). The sensor unit 12 can also include switch elements (not shown) for processing signals from the photoelectric conversion units and wirings (not shown) for driving the switch elements. The signal reading unit 13 can be used to read a signal corresponding to an output from the sensor unit 12 from outside the radiation detection apparatus 1.

The structure ST can include a first member 21 and a second member 22. The first member 21 functions as, for example, a sensor protective layer, and can protect the surface of the sensor unit 12. The second member 22 functions as, for example, a scintillator underlying layer and can improve the adhesiveness with the scintillator layer 30 subsequently formed by vapor deposition by planarizing the surface by using activation processing such as atmospheric-pressure plasma processing. The scintillator layer 30 can convert radiation (including electromagnetic waves such as X-rays, α-rays, β-rays, and γ-rays) into light. In this case, the relationship among a refractive index n1 of the first member 21, a refractive index n2 of the second member 22, and a refractive index n3 of the scintillator layer 30 may satisfy n1<n2<n3.

The radiation detection apparatus 1 can further include a scintillator protective layer 40 disposed on the scintillator layer 30, a reflection layer 50 disposed on the scintillator protective layer 40, and a protective layer 60 disposed on the reflection layer 50. The reflection layer 50 can reflect light propagating to the incident side of radiation toward the scintillator layer 30. This can improve the utilization efficiency of light generated in the scintillator layer. At the same time, the reflection layer 50 can also function as a layer which blocks light other than light generated in the scintillator layer 30, for example, external rays of light. The protective layer 60 can protect the above constituent members against external environments such as humidity and physical impact.

Figure 2:
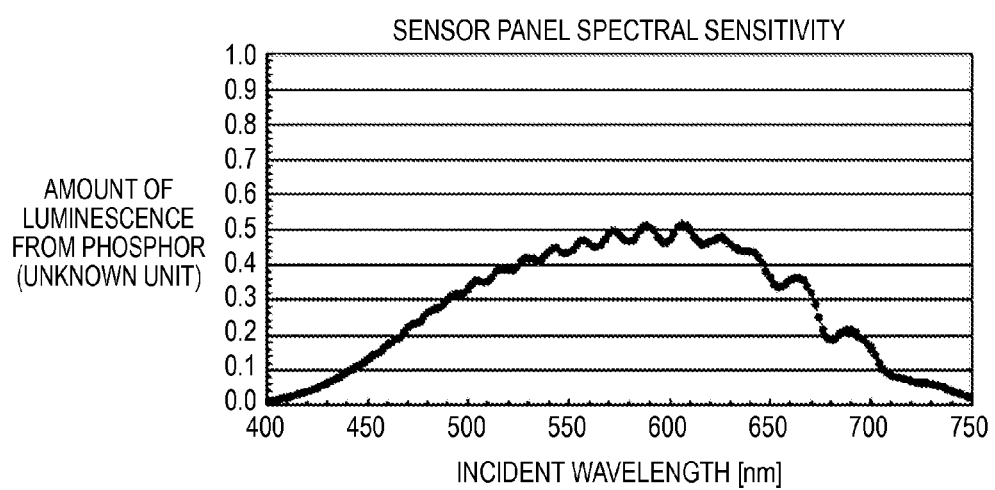
FIG. 2 is a graph for explaining the wavelength dependence of photosensitivity of a sensor unit 12.

A more concrete example of each of the above constituent members will be described below. For example, glass, heat-resistant plastic, or the like can be used for the sensor substrate 11. For the sensor unit 12, photoelectric conversion units such as MIS-type sensors, PIN-type sensors, or TFT-type sensors can be provided by using a semiconductor such as amorphous silicon (a-Si). For example, as shown in FIG. 2, in the wavelength distribution of light which can be detected by the sensor unit 12 using MIS-type a-Si sensors, a wavelength peak can exist in the range of wavelengths λ=550 to 650 nm. A photoelectrically converted signal can be read by a TFT (not shown) and output to a signal processing circuit (not shown) via a signal wiring. For the first member 21, for example, it is possible to use a member made of an inorganic material such as SiN or $SiO_2$.

For the second member 22, for example, silicone-based resin, polyimide-based resin, polyamide-based resin, epoxy-based resin, or a resin containing an organic material such as paraxylene or acryl is used. For example, a thermosetting polyimide-based resin is a typical material. In addition, it is preferable to use a resin having heat resistance so as not to deteriorate in a process with a high temperature condition such as vapor deposition or annealing for the scintillator layer 30.

Figure 3A:
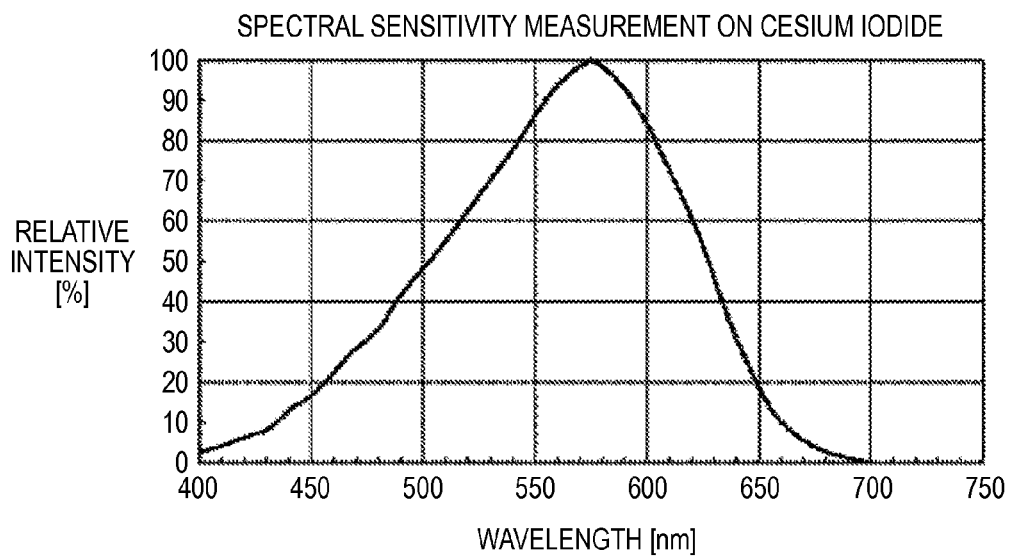
FIG. 3A is a graph for explaining the wavelength distribution of light generated in a scintillator layer 30.

In general, a layer having a columnar crystal structure can be used as the scintillator layer 30 for the purpose of suppressing light scattering or increasing resolution. It is however possible to use a layer having a structure other than a columnar crystal structure. More specifically, for example, it is possible to use a material containing alkali halide as a major ingredient such as CsI:Tl, CsI:Na, CsBr:Tl, NaI:Tl, LiI:Eu, or KI:Tl. For example, CsI:Tl can be obtained by simultaneously depositing CsI and TlI. For example, a particulate crystal such as gadolinium oxide sulfide (GOS) may be used. When using CsI:Tl for the scintillator layer 30, light containing wavelengths ranging λ=400 to 700 nm can be generated, as shown in FIG. 3A. This emitted light can have a peak near wavelengths λ=550 to 600 nm. Likewise, when using GOS for the scintillator layer 30, the emitted light can have a peak near wavelength λ=540 nm, as exemplified by FIG. 3B.

For the scintillator protective layer 40, it is possible to use, for example, a polyimide-based, epoxy-based, polyolefin-based, polyester-based, polyurethane-based, or polyamide-based hot-melt resin. It is especially preferable to use a material having low moisture permeability. The scintillator protective layer 40 preferably has a thickness of about 10 to 200 μm.

For the reflection layer 50, for example, it is possible to use a metal having high reflectance such as Al, Ag, Cr, Cu, Ni, Ti, Mg, Rh, Pt, or Au or an alloy of them. The reflection layer 50 preferably has a thickness of about 1 to 100 μm. If the thickness of the reflection layer 50 is smaller than 1 μm, a pinhole defect can occur at the time of formation of the reflection layer 50. If the thickness of the reflection layer 50 is larger than 100 μm, the absorption amount of radiation increases. This may lead to an increase in the exposure dose of the operator who performs imaging. In addition, this can cause a problem in the manufacture, that is, it is difficult to cover the step between the scintillator layer 30 and the sensor panel 10 without any gap.

Although any material can be used for the protective layer 60, it is preferable to use a material exhibiting high transmittance with respect to radiation. For example, it is possible to use CFRP and amorphous carbon. In addition, it is possible to use a film material such as polyethylene terephthalate, polycarbonate, vinyl chloride, polyethylene naphthalate, or polyimide. The protective layer 60 preferably has a thickness of about 10 to 100 μm. It is possible to provide one of the reflection layer 50 and the protective layer 60 as a member serving both the functions. In this case, a metal substrate made of Al, Au, or the like can be used.

Figure 4:
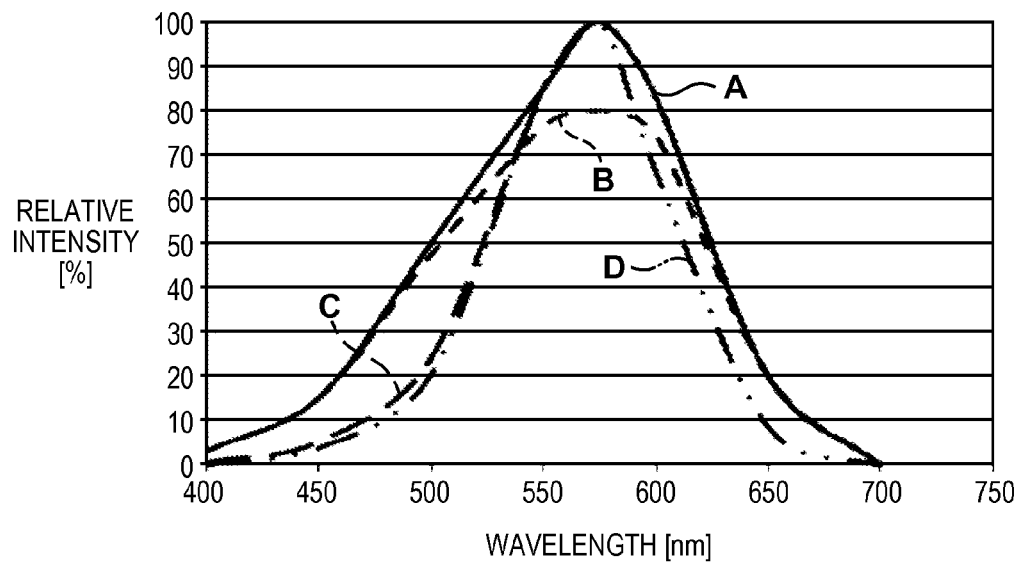
FIG. 4 is a graph for explaining one example of the refraction of light in the radiation detection apparatus according to each embodiment.

As described above, the relationship among the refractive index n1 of the first member 21, the refractive index n2 of the second member 22, and the refractive index n3 of the scintillator layer 30 may satisfy n1<n2<n3. This increases the optical path length of light which obliquely propagates, and hence can attenuate the obliquely propagating light, as shown in FIG. 4. It is therefore possible to improve an MTF (Modulation Transfer Function) as an index of the sharpness of an image which can be obtained by the radiation detection apparatus 1.

The following will describe, with reference to FIG. 4, the calculation of the distance that the light generated in the scintillator layer 30 laterally propagates until it reaches the sensor area in a case in which refractive indices are respectively provided for the constituent members in the above manner. For example, it is possible to use a $SiO_2$ member having a thickness of 0.5 μm and a refractive index of 1.45 as the first member 21. In addition, it is possible to use a polyimide-based resin member having a thickness of 5 μm and a refractive index of 1.7 as the second member 22. It is possible to use, for example, a CsI:Tl layer having a thickness of 380 μm and a refractive index of 1.8 as the scintillator layer 30. In this case, critical angle $\alpha_{32}$=70.8° on an interface P between the scintillator layer 30 and the second member 22, and hence light at incident angles equal to or larger than $\alpha_{32}$ can be totally reflected by the interface P. In addition, critical angle $\alpha_{21}$=58.5° on an interface Q between the second member 22 and the first member 21, and hence light at incident angles equal to or larger than $\alpha_{21}$ can be totally reflected by the interface Q.

Let X be a luminous point (a point at which radiation is converted into light), L be the distance that light laterally propagates from the luminous point X until it reaches the sensor area, and $\alpha_{ST}$ be a critical angle on the structure ST. In addition, H1 to H3 respectively indicate the thicknesses of the first member 21, second member 22, and scintillator layer 30. In this case, it is possible to calculate $L = H3 \times \tan \alpha_{ST} + H2 \times n3 \times \sin \alpha_{ST}/(n2^2-(n3 \times \sin \alpha_{ST})^2)^{1/2} + H1 \times n3 \times \sin \alpha_{ST}/(n1^2-(n3 \times \sin \alpha_{ST})^2)^{1/2}$. In addition, since $n3 \times \sin \theta_3 = n2 \times \sin \theta_2 = n1 \times \sin \theta_1$, critical angle $\alpha_{ST} = \arcsin(n1/n3)$. In this case, $\theta_1$ to $\theta_3$ respectively indicate incident angles on the first member 21, the second member 22, and the scintillator layer 30. Since $\alpha_{ST}$=53°, x=511 μm can be obtained. That is, a distance x that light laterally propagates from the luminous point X until it reaches the sensor area can be calculated to be equal to or smaller than at least 511 μm. In this manner, it is possible to examine how to design the pitch of the sensor unit 12 or select the thicknesses, refractive indices, and the like of the respective constituent members.

As described above, this embodiment can provide a radiation detection apparatus with high sharpness.

Second Embodiment

Figure 5:
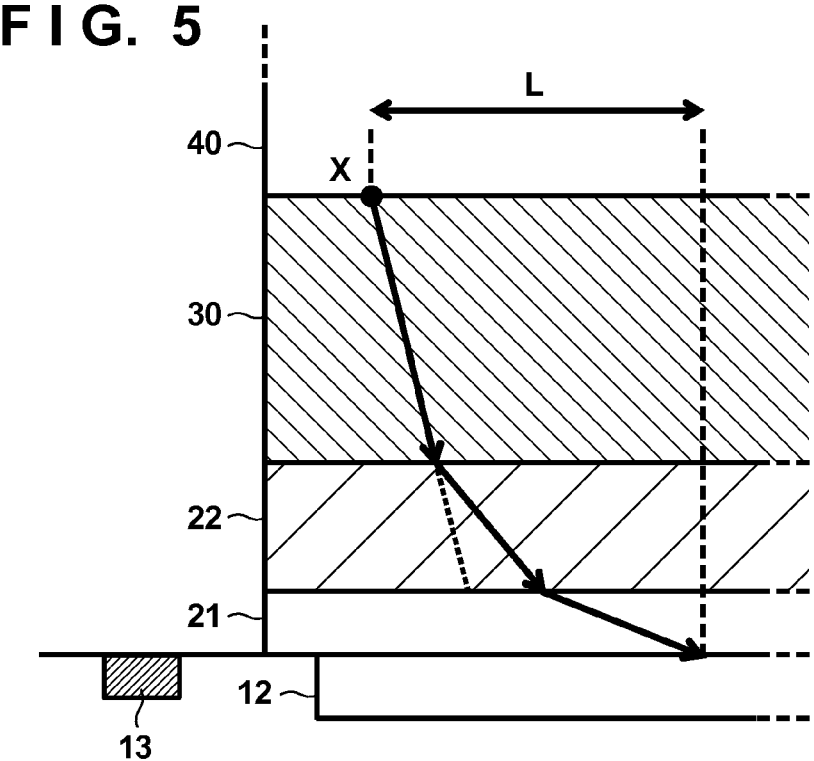
FIG. 5 is a view for explaining the relationship between the light intensities and the wavelengths detected by the sensor unit 12.

A radiation detection apparatus 2 of the second embodiment will be described with reference to FIGS. 1 and 5. This embodiment differs from the first embodiment in that the second member 22 is positively provided with the function of a color filter to become a second member 22a. It is possible to select a member for the second member 22a so as to selectively transmit light having a desired wavelength or selectively absorb light having a desired wavelength and to select a material which absorbs wavelengths in a range including the peak wavelength of light generated in a scintillator layer 30.

For the second member 22a, for example, silicone-based resin, polyimide-based resin, polyamide-based resin, epoxy-based resin, or a resin containing an organic material such as paraxylene or acryl is used. For example, a thermosetting polyimide-based resin is a typical material. In addition, it is preferable to use a resin having heat resistance so as not to deteriorate in a process with a high temperature condition such as vapor deposition or annealing for the scintillator layer 30. The second member 22a preferably has a thickness of 50 μm or less and especially preferably has a thickness of 10 μm or less. For example, a polyimide-based resin member as an yellow filter having a thickness of 5 μm and a refractive index of 1.7 can be used for the second member 22a. This polyimide-based resin member can be formed by using a coating means such as slit coater coating, spin coater coating, screen printing, dipping coating, spray coating, or inkjet coating. It is also possible to bond a sheet-like polyimide-based resin member with an adhesive material (pressure-sensitive adhesive).

As in the first embodiment, the relationship among the refractive indices of a first member 21, the second member 22a, and the scintillator layer 30 may satisfy n1<n2<n3. This increases the optical path length of obliquely incident light to allow the second member 22a to effectively absorb obliquely propagating light. It is therefore possible to reduce components, of the light generated in the scintillator layer 30, which can be optically scattered until the light reaches a sensor unit 12. This can improve the sharpness of the image which can be obtained by the radiation detection apparatus 2.

The relationship between the color of a color filter and a wavelength $\lambda$ of light which can be absorbed in light which can be generated from the scintillator layer 30 using CsI:Tl will be described below. Blue filters can absorb light with $\lambda$=480 nm or more. Cyan filters can absorb light with $\lambda$=530 nm or more. Green filters can absorb light with $\lambda$=530 nm or less and 630 nm or more. Yellow filters can absorb light with $\lambda$=530 nm or less. Magenta filters can absorb light with $\lambda$=460 nm or more and 630 nm or less. Orange filters can absorb light with $\lambda$=611 nm or less. Red filters can absorb light with $\lambda$=660 nm or less. Using black like carbon black or gray obtained by mixing black and white pigments can absorb light with all the wavelengths, of the wavelengths of light generated by the scintillator layer 30, which fall within the range of wavelengths which can be detected by the sensor unit 12. The designer can determine the use of a color filter with a specific color so as to selectively transmit or absorb light with a desired wavelength. For example, he/she may select a commercial available optical filter.

For example, the light generated in the scintillator layer 30 using CsI:Tl has a wavelength peak at $\lambda$=500 to 550 nm, and hence the designer may select, for example, magenta. FIG. 5 exemplifies the wavelength distribution of the intensities of light which can reach the sensor unit 12 when using a color filter in accordance with the peak wavelength $\lambda$ of light which can be generated from the scintillator layer 30. A solid line A indicates a case of using no color filter. A dotted line B indicates a case of using a color filter which absorbs light with the peak wavelength. A broken line C indicates a case of using a color filter which absorbs light with wavelengths shorter than the peak wavelength. In addition, a two-dot chain line D indicates a case of using a color filter which absorbs light having wavelengths shorter and longer than the peak wavelength.

As described above, this embodiment can provide a radiation detection apparatus with high sharpness.

Third Embodiment

A radiation detection apparatus 3 of the third embodiment will be described with reference to FIG. 1. This embodiment differs from the first and second embodiments in that a light absorption layer 40a is provided instead of the scintillator protective layer 40. The light absorption layer 40a can function as a layer for protecting a scintillator layer 30 and can also be used as a color filter which absorbs light with a predetermined wavelength. This layer can absorb part or all of light generated in the scintillator layer 30. This can improve the sharpness of an image which can be obtained by the radiation detection apparatus 3. This is because the scintillator layer 30 absorbs a larger amount of radiation and generates light at a position closer to the incident side of radiation, and hence the amount of light scattered is larger at a position closer to the incident side.

A reflection layer 50 can reflect light from the scintillator layer toward the scintillator layer 30. The reflected light can pass through the light absorption layer 40a again. At this time, since the optical path length of light obliquely propagating toward the sensor unit 12 is long, the light absorption layer 40a can effectively absorb the light. In consideration of this, it is preferable to set the relationship between a refractive index n4 of the light absorption layer 40a and a refractive index n3 of the scintillator layer 30 to n3>n4.

For the light absorption layer 40a, it is possible to use a film material such as polyethylene terephthalate, polycarbonate, vinyl chloride, polyethylene naphthalate, polyimide, or acryl. As a resin which allows molding by thermocompression bonding, it is possible to use, for example, a polyimide-based, epoxy-based, polyolefin-based, polyester-based, polyurethane-based, or polyamide-based hot-melt resin. It is especially preferable to use a material having low moisture permeability. The light absorption layer 40a preferably has a thickness of 2 μm or more and 100 μm or less. In addition, setting this thickness to 5 μm or more and 50 μm or less can further increase the sharpness and luminance of an image which can be obtained.

Figure 3B:
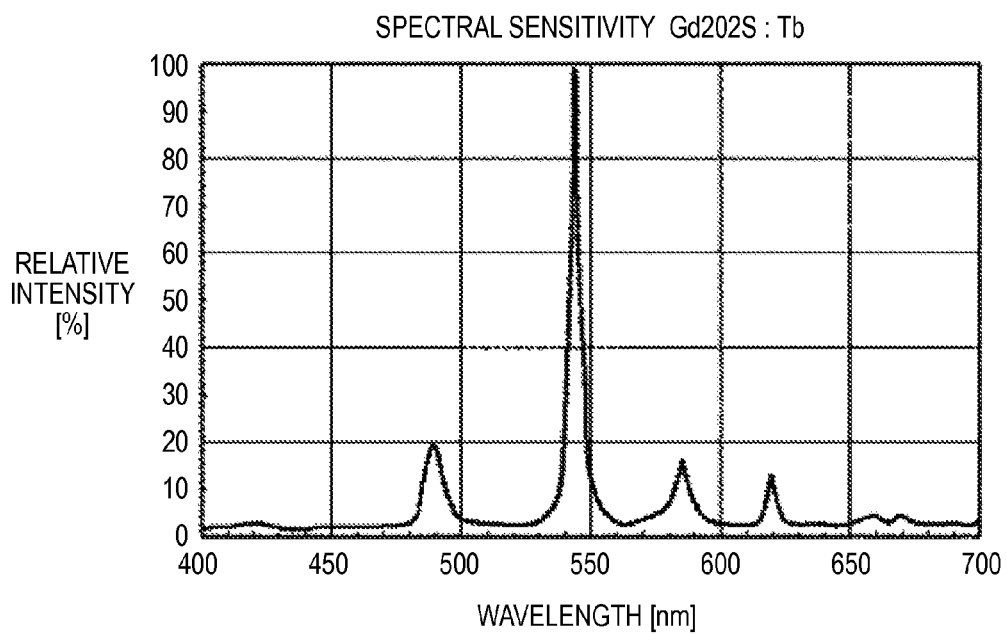
FIG. 3B is a graph for explaining the wavelength distribution of light generated in the scintillator layer 30.

For example, both the light absorption layer 40a and a second member 22a can be provided as yellow filters (which absorb light with $\lambda$=530 nm or less). The reflection layer 50 reflects light from the scintillator layer 30, and the light absorption layer 40a can greatly attenuate the light until it reaches the sensor unit 12. In addition, for example, the second member 22a and the light absorption layer 40a can be provided as color filters of different colors. For example, the light absorption layer 40a can be provided as an acrylic red filter (which absorbs light with $\lambda$=660 nm or less) with a refractive index of 1.6. A red filter can absorb light in a wider range than a yellow filter. It is therefore possible to preferentially attenuate return light from the second member 22a which reaches the sensor unit 12. Likewise, it is possible to provide the light absorption layer 40a as a black filter (which absorbs light with wavelengths in a wide range) by using a hot-melt resin including carbon black. It is also possible to provide, for example, the second member 22a as a green filter (which absorbs light with $\lambda$=530 nm or less and 570 nm or more) and to provide the light absorption layer 40a as a magenta filter (which absorbs light with $\lambda$=460 to 630 nm or less). When, for example, using GOS for the scintillator layer 30, as shown in FIG. 3B, a wavelength peak appears near $\lambda$=530 to 560 nm. The second member 22a can transmit light having a wavelength peak near $\lambda$=530 to 560 nm and absorb light having wavelength peaks near $\lambda$=490 nm, 580 nm, and 620 nm. The light absorption layer 40a can effectively absorb light propagating from the scintillator layer 30 toward the reflection layer 50. In addition, it is possible to provide the second member 22a as a gray filter (which absorbs light with wavelengths in a wide range). This can prevent light which has struck the sensor unit 12 from being reflected and scattered by metal wirings including the sensor unit 12 and can prevent the reflected light/scattered light from striking the sensor unit 12 again.

As described above, this embodiment can provide a radiation detection apparatus with high sharpness.

Although the three embodiments have been described above, the present invention is not limited to them, the object, state, application, function, and other specifications can be changed as needed, and can be carried out by other embodiments.

For example, it is possible to apply the present invention to a so-called laminated radiation detection apparatus obtained by laminating a scintillator panel and a sensor panel. A scintillator panel can be formed by providing a scintillator underlying layer on a support substrate, providing a scintillator layer on the scintillator underlying layer, and covering the resultant structure with a hot-melt resin layer. For the support substrate, it is possible to use any of the materials including a metal plate, metal foil, resin, glass, ceramic, and the like. For example, it is possible to use a member having radiation transmittance such as an amorphous carbon substrate, Al substrate, CFRP substrate, glass substrate, or a quartz substrate. In this case, for example, the second member 22a corresponds to the hot-melt resin covering the scintillator layer, and allows to laminate the scintillator panel and the sensor panel by using its adhesiveness. It is possible to use an adhesive material. In this case, the second member 22a can absorb obliquely incident light or scattered light. As this adhesive material, it is possible to use, for example, an acrylic-based, epoxy-based, olefin-based, or silicone-based resin. It is especially preferable to use an acrylic-based resin with optically high transmittance. In addition, a thermoplastic resin, thermosetting resin, or heat melt-solidification type hot-melt resin (for example, a resin containing polyolefin, polyester, or polyamide as a major component) may be used. One of the first member 21 and an adhesive material may be provided so as to function as a color filter instead of or together with the second member 22a.

Figure 6:
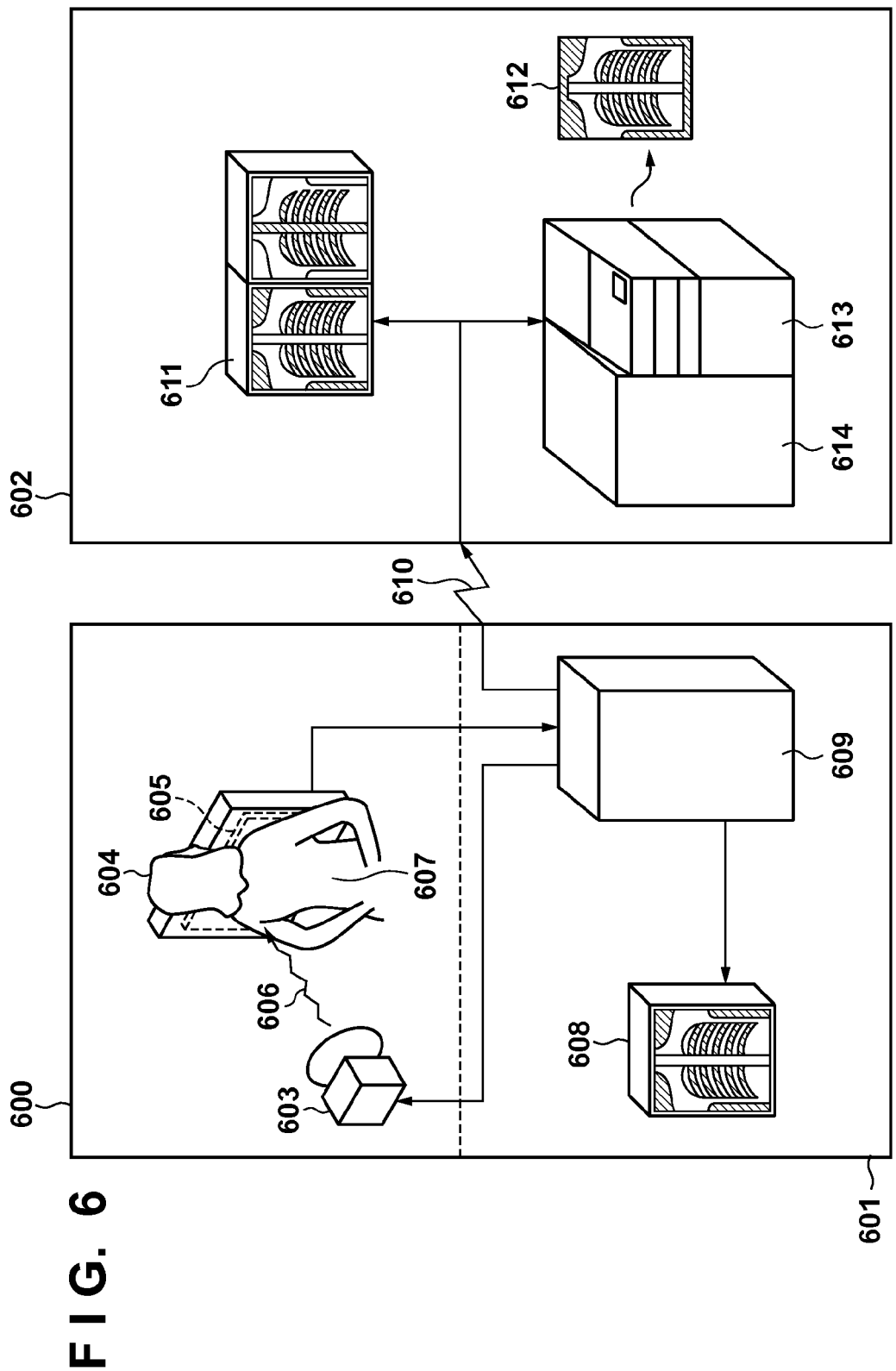
FIG. 6 is a view for explaining a radiographic system according to the present invention.

FIG. 6 shows an application example in which the radiation detection apparatus according to the present invention is applied to a radiographic system. As an X-ray detection apparatus 605, it is possible to use a radiation detection apparatus of each embodiment. In an X-ray room 600, an X-ray 606 generated by an X-ray tube 603 as a radiation source is transmitted through a chest portion 607 of an object 604 (for example, a patient) and can enter the X-ray detection apparatus 605. This incident X-ray can contain information of the interior of the body of the object 604. The X-ray detection apparatus 605 can acquire electrical information corresponding to the incident X-ray. It is possible to convert this information into a digital signal and perform image processing of the signal by using an image processor 609 (signal processing unit). The processed signal can be displayed on a display 608 (display unit) installed in a control room 601 and observed.

In addition, a transmission means 610 (transmission unit) using a network technology such as the Internet or a telephone line can transfer the above digital signal from, for example, the control room 601 to a doctor room 602 as a remote place. The transferred signal can be displayed on, for example, a display 611 installed in the doctor room 602 and observed. Furthermore, it is possible to input this signal to a film processor 614 and record it on a film 612 by using a laser printer 613 (recording unit). Observing the display 611 or the film 612 allows a doctor or the like in a remote place to diagnose the state of the object 604. In addition, it is possible to hold the above signal in an optical disk or the like (holding unit).

Although the above description has exemplified the X-ray detection apparatus, the present invention can be applied to a detection apparatus for α-rays, β-rays, γ-rays, or the like by replacing the scintillator. As such a scintillator, it is possible to use a conventionally known scintillator sensitive to each type of radiation. For example, a zinc sulfide (silver) scintillator is known for α-rays. A plastic scintillator with an organic fluorescent pigment such as POPOP being dissolved in a plastic such as polystyrene is known for β-rays. A scintillator formed from a sodium iodide single crystal activated by thallium is known for γ-rays. As described above, it is possible to modify and execute the present invention in accordance with applications, as needed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-259510, filed Nov. 28, 2011, which is hereby incorporated by reference herein in its entirety.

What is claimed is:

1. A radiation detection apparatus comprising:
   a sensor unit having photoelectric conversion units two-dimensionally arranged;
   a first member which is disposed on said sensor unit; and
   a second member which is disposed on said first member; and
   a scintillator layer for converting radiation into light disposed on said second member,
   wherein, letting n1 be a refractive index of said first member, n2 be a refractive index of said second member, and n3 be a refractive index of the scintillator layer, a relationship n1<n2<n3 holds, and
   wherein said second member includes a member which absorbs light.

2. A radiographic system comprising:
   a radiation detection apparatus according to claim 1;
   a signal processing unit which processes a signal from said radiation detection apparatus;
   a recording unit which records a signal from said signal processing unit;
   a display unit which displays a signal from said signal processing unit; and
   a transmission unit which transmits a signal from said signal processing unit.

3. A radiation detection apparatus comprising:
   a sensor unit having photoelectric conversion units two-dimensionally arranged;
   a first member which is disposed on said sensor unit;
   a second member which is disposed on said first member;
   a scintillator layer for converting radiation into light disposed on said second member;
   a light absorption layer which is disposed on said scintillator layer and absorbs light; and
   a reflection layer which is disposed on said light absorption layer and reflects light from said scintillator layer toward said scintillator layer,
   wherein, letting n1 be a refractive index of said first member, n2 be a refractive index of said second member, and n3 be a refractive index of the scintillator layer, a relationship n1<n2<n3 holds, and letting n4 be a refractive index of said light absorption layer, a relationship n3>n4 holds.

4. A radiographic system comprising:
   a radiation detection apparatus according to claim 3;
   a signal processing unit which processes a signal from said radiation detection apparatus;
   a recording unit which records a signal from said signal processing unit;

a display unit which displays a signal from said signal processing unit; and a transmission unit which transmits a signal from said signal processing unit.

5. A radiation detection apparatus comprising:

a sensor unit having photoelectric conversion units two-dimensionally arranged;

a scintillator layer which converts radiation into light; and a structure which is disposed between said sensor unit and said scintillator layer, wherein said structure includes a first member which contacts said photoelectric conversion units and a second member which is disposed on said first member and contacts said first member, and wherein a refractive index of said first member is lower than a refractive index of said second member, and wherein said second member includes a member which absorbs light.

6. A radiographic system comprising:

a radiation detection apparatus according to claim 5;

a signal processing unit which processes a signal from said radiation detection apparatus;

a recording unit which records a signal from said signal processing unit;

a display unit which displays a signal from said signal processing unit; and a transmission unit which transmits a signal from said signal processing unit.

7. A radiation detection apparatus comprising:

a sensor unit having photoelectric conversion units two-dimensionally arranged;

a scintillator layer which converts radiation into light;

a structure which is disposed between said sensor unit and said scintillator layer;

a light absorption layer which is disposed on said scintillator layer and absorbs light; and a reflection layer which is disposed on said light absorption layer and reflects light from said scintillator layer toward said scintillator layer, wherein said structure includes a first member which contacts said photoelectric conversion units and a second member which is disposed on said first member and contacts said first member, and wherein a refractive index of said first member is lower than a refractive index of said second member, and a refractive index of said light absorption layer is lower than that of said scintillator layer.

8. A radiographic system comprising:

a radiation detection apparatus according to claim 7;

a signal processing unit which processes a signal from said radiation detection apparatus;

a recording unit which records a signal from said signal processing unit;

a display unit which displays a signal from said signal processing unit; and a transmission unit which transmits a signal from said signal processing unit.

* * * * *